US008704952B2

(12) United States Patent
Munnan

(10) Patent No.: US 8,704,952 B2
(45) Date of Patent: Apr. 22, 2014

(54) VIDEO DECODER

(75) Inventor: Ravindranath Ramalingaiah Munnan, Bengaluru (IN)

(73) Assignee: STMicroelectronics International N.V., Amsterdam (NL)

(*) Notice: Subject to any disclaimer, the term of this patent is extended or adjusted under 35 U.S.C. 154(b) by 189 days.

(21) Appl. No.: 13/250,581

(22) Filed: Sep. 30, 2011

(65) Prior Publication Data

US 2013/0083247 A1 Apr. 4, 2013

(51) Int. Cl.
*H04N 9/66* (2006.01)

(52) U.S. Cl.
USPC .......... 348/638; 348/649; 348/491; 348/504; 348/507; 348/587; 348/592; 348/703; 348/726

(58) Field of Classification Search
USPC ........ 348/638, 642, 649, 653, 654, 491, 504, 348/493, 587, 592, 703, 507, 726
See application file for complete search history.

(56) References Cited

U.S. PATENT DOCUMENTS 7,508,451 B2 * 3/2009 Sheng et al. .................. 348/507

* cited by examiner

*Primary Examiner* — Jefferey Harold
*Assistant Examiner* — Omer Khalid
(74) *Attorney, Agent, or Firm* — Hogan Lovells US LLP

(57) ABSTRACT

A video decoder that separates and analyzes analog video signals includes a hue and saturation separator and a video signal determiner. The hue and saturation separator demodulates from a component video signal chroma signal, which includes a hue signal and a saturation signal. The video signal determiner determines at least one video signal characteristic of the component video signal dependent on the hue and saturation signal. The video signal determiner may include a mode determiner that determines the encoding standard of the video signal, and a color burst determiner that determines a location of a color burst signal with the video signal. The mode determiner may include a signal lock detector, a sequence matcher, and an encoding mode selector. The color burst determiner may include an absolute value determiner and a burst position determiner.

47 Claims, 11 Drawing Sheets

VIDEO DECODER

FIELD OF THE INVENTION

The present invention relates generally to a video decoder. The invention relates more particularly to a video decoder as part of a television receiver.

BACKGROUND OF THE INVENTION

Analog video signals define image data stored by the use of an analog modulation on an electrical signal. There are many established color analog video formats. One such color analog video system specifies the video image in terms of the luminance or luma (Y) and chrominance or chroma (C) of the image.

An analog video decoder can receive in a single channel or signal a color analog encoded video signal, for example, from a composite video input or from a television broadcast encoded analog signal. The luma and chroma components of the analog video signal can then be separated in such a way that they can then be presented on a screen or display.

Analog video is used in both consumer and professional applications and is found in many terrestrial television broadcast systems. For example, composite video, a format of analog television picture (picture only) signals, contains all the required video information, including color, in a single line level signal. Composite video is sometimes known as CVBS (composite video broadcast signal). The composite signal is a composite of three source signals Y (luma), U and V (representing hue and saturation or chrominance). Composite video signals can be found, for example, in many standard formats such as NTSC (National Television System Committee), PAL (Phase Alternating Line), and SECAM (Sequential Color with Memory) as well as the various sub-standards of these standards such as PAL-M, PAL-N, NTSC443, PAL-60.

A typical analog video decoder receives the composite video signal and separates these into the three source signals. However, in order to apply correct color decoding techniques to separate the luma and chroma to produce the correct image output, detecting the correct mode and/or standard of the modulation/encoding allows a more efficient decoding operation to be performed. Some standards can, for example, be detected by their synchronization timings; however, some cannot. For example, the PAL and SECAM standards have closely matched color burst frequencies and synchronization timings.

Furthermore, determining the color burst position in CVBS is similarly important in accurate video mode detection; under poor broadcast conditions the color burst position can be located in positions other than the designated or expected position on the back porch region of the signal.

SUMMARY OF THE INVENTION

Embodiments of the present application aim to address the above problems.

There is provided according to the disclosure a video decoder comprising: a hue and saturation separator configured to demodulate from a component video signal chroma signal a hue signal and a saturation signal; and a video signal determiner configured to determine at least one video signal characteristic of the component video signal dependent on the hue and saturation signal.

The video signal determiner may comprise a mode determiner configured to determine the encoding standard of the video signal.

The mode determiner may comprise: a signal lock detector configured to determine when a phase alternating line phase lock occurs between the hue signal and saturation signal; a sequence matcher configured to receive the video signal chroma signal and determine when the $D_b$ and $D_r$ sequence from the chroma signal match; and an encoding mode selector configured to output an encoding standard indicator dependent on the signal lock detector and sequence matcher.

The encoding mode selector may be configured to output a phase alternating line encoding standard indicator when the signal lock detector determines the hue signal and the saturation signal are phase locked.

The encoding mode selector may be configured to output a SECAM encoding standard indicator when the signal lock detector fails to determine the hue signal and the saturation signal are phase locked and the sequence matcher determines the $D_b$ and $D_r$ sequence from the chroma signal match.

The encoding mode selector may be configured to output an unknown encoding standard indicator when the signal lock detector fails to determine the hue signal and the saturation signal are phase locked and the sequence matcher fails to determine the $D_b$ and $D_r$ sequence from the chroma signal match.

The video signal determiner may comprise a color burst determiner configured to determine a location of a color burst signal within the video signal.

The color burst determiner may comprise: an absolute value determiner configured to sum the modulus values for the saturation and hue signals; and a burst position determiner configured to determine the color burst location dependent on the summed modulus values for the saturation and hue signals.

The color burst determiner may further comprise a burst position indicator generator configured to output an indicator value relative to a horizontal synchronization signal.

The burst position determiner may comprise a comparator configured to compare the sum of the modulus values for the saturation and hue signals against a threshold value and return a comparison indicator value.

The comparator may be configured to output the comparison indicator dependent on a backporch indicator signal.

The burst position determiner may be configured to receive a backporch indicator signal configured to indicate when the video signal is in the backporch region.

The burst position determiner may comprise a threshold determiner configured to determine the threshold value.

The threshold determiner may be configured to determine the threshold value as half the maximum value of the sum the modulus values for the saturation and hue signal.

The burst position determiner may further comprise: a splitter configured to split the comparator comparison indicator value signal into a determined number of parts; and a counter configured to examine at least one part comparator comparison indicator value signal and generate a counter value output.

The counter may be further configured to: increment the counter value output when the comparator comparison indicator value signal indicates that the occurrence of the sum of the modulus values for the saturation and hue signals is greater than the threshold for a greater portion of the part; and decrement the counter value output when the comparator comparison indicator value signal indicates that the occurrence of the sum of the modulus values for the saturation and hue signals is less than the threshold for a greater portion of the part.

The degree of change of the counter value output for at least one part may be dependent on the ratio of the occurrence of the sum of the modulus values for the saturation and hue signals is greater than or less than the threshold.

The burst position determiner may further comprise a local maximum determiner configured to determine the location of a color burst signal at a local maximum counter value output.

According to a second aspect there is provided a method for video decoding comprising: demodulating from a component video signal chrome signal a hue signal and a saturation signal; and determining at least one video signal characteristic of the component video signal dependent on the hue and saturation signal.

Determining at least one video signal characteristic of the component video signal dependent on the hue and saturation signal may comprise determining the encoding standard of the video signal.

Determining at least one video signal characteristic of the component video signal dependent on the hue and saturation signal may comprise: determining when a phase alternating line phase lock occurs between the hue signal and saturation signal; receiving the video signal chrome signal and determining when a $D_b$ and $D_r$ sequence from the chrome signal match; and outputting an encoding standard indicator dependent on the condition of the signal lock and sequence match.

Outputting an encoding standard indicator dependent on the condition of the signal lock and sequence match may comprise outputting a phase alternating line encoding standard indicator when the hue signal and the saturation signal are phase locked.

Outputting an encoding standard indicator dependent on the condition of the signal lock and sequence match may comprise outputting a SECAM encoding standard indicator when the hue signal and the saturation signal are not phase locked and the $D_b$ and $D_r$ sequence from the chroma signal match.

Outputting an encoding standard indicator dependent on the condition of the signal lock and sequence match may comprise outputting an unknown encoding standard indicator when the hue signal and the saturation signal are not phase locked and the $D_b$ and $D_r$ sequence from the chroma signal are not matched.

Determining at least one video signal characteristic of the component video signal dependent on the hue and saturation signal may comprise determining a location of a color burst signal within the video signal.

Determining the location of a color burst signal within the video signal may comprise: summing the modulus values for the saturation and hue signals, and determining the color burst location dependent on the summed modulus values for the saturation and hue signals.

Determining the location of a color burst signal within the video signal further may comprise outputting a color burst indicator value relative to a horizontal synchronization signal.

Determining the location of a color burst signal within the video signal may comprise: comparing the sum of the modulus values for the saturation and hue signals against a threshold; and returning a comparison indicator value.

Returning a comparison indicator value may comprise outputting the comparison indicator dependent on a backporch indicator signal.

Determining the location of a color burst signal may comprise receiving a backporch indicator signal configured to indicate when the video signal is in the backporch region.

Determining the location of a color burst signal may comprise determining the threshold value.

Determining the threshold value may comprise determining the threshold value as half the maximum value of the sum the modulus values for the saturation and hue signal.

Determining the location of a color burst signal may further comprise: splitting the comparison indicator value signal into a determined number of parts; and examining at least one part comparison indicator value signal to generate a counter value output.

Examining at least one part comparison indicator value signal to generate a counter value output may comprise: incrementing the counter value output when the comparison indicator value signal indicates that the occurrence of the sum of the modulus values for the saturation and hue signals is greater than the threshold for a greater portion of the part; and decrementing the counter value output when the comparison indicator value signal indicates that the occurrence of the sum of the modulus values for the saturation and hue signals is less than the threshold for a greater portion of the part.

A degree of change of the incrementing the counter value output or decrementing the counter value output for at least one part may be dependent on the ratio of the occurrence of the of the sum of the modulus values for the saturation and hue signals is greater than or less than the threshold.

The determining the location of a color burst signal may further comprise determining the location of the color burst signal at a local maximum counter value output.

According to a third aspect there is provided a chipset comprising the video decoder as discussed herein.

According to a fourth aspect there is provided a television receiver comprising the video decoder as discussed herein.

According to a fifth aspect there is provided an integrated circuit comprising the video decoder as discussed herein.

According to a sixth aspect there is provided a video player comprising the video decoder as discussed herein.

According to a seventh aspect there is provided a processor-readable medium encoded with instructions that, when executed by a processor, perform a method for decoding video as discussed herein.

According to an eighth aspect there is provided apparatus comprising at least one processor and at least one memory, including computer code, for one or more programs, the at least one memory and the computer code configured to, with the at least one processor, cause the apparatus to at least perform a method as discussed herein.

According to a ninth aspect there is provided a video decoder comprising: means for demodulating from a component video signal chroma signal a hue signal and a saturation signal; and means for determining at least one video signal characteristic of the component video signal dependent on the hue and saturation signal.

The means for determining at least one video signal characteristic of the component video signal dependent on the hue and saturation signal may comprise means for determining the encoding standard of the video signal.

The means for determining at least one video signal characteristic of the component video signal dependent on the hue and saturation signal may comprise: means for determining when a phase alternating line phase lock occurring between the hue signal and saturation signal; means for receiving the video signal chroma signal and determining when a $D_b$ and $D_r$ sequence from the chrome signal match; and means for outputting an encoding standard indicator dependent on the condition of the signal lock and sequence match.

The means for outputting an encoding standard indicator dependent on the condition of the signal lock and sequence match may comprise means for outputting a phase alternating line encoding standard indicator when the hue signal and the saturation signal are phase locked.

The means for outputting an encoding standard indicator dependent on the condition of the signal lock and sequence match may comprise means for outputting a SECAM encoding standard indicator when the hue signal and the saturation signal are not phase locked and the $D_b$ and $D_r$ sequence from the chroma signal match.

The means for outputting an encoding standard indicator dependent on the condition of the signal lock and sequence match may comprise means for outputting an unknown encoding standard indicator when the hue signal and the saturation signal are not phase locked and the $D_b$ and $D_r$ sequence from the chroma signal are not matched.

The means for determining at least one video signal characteristic of the component video signal dependent on the hue and saturation signal may comprise means for determining a location of a color burst signal within the video signal.

The means for determining the location of a color burst signal within the video signal may comprise: means for summing the modulus values for the saturation and hue signals; and means for determining the color burst location dependent on the summed modulus values for the saturation and hue signals.

The means for determining the location of a color burst signal within the video signal may further comprise means for outputting a color burst indicator value relative to a horizontal synchronization signal.

The means for determining the location of a color burst signal within the video signal may comprise: means for comparing the sum of the modulus values for the saturation and hue signals against a threshold value; and means for returning a comparison indicator value.

The means for returning a comparison indicator value may comprise means for outputting the comparison indicator dependent on a backporch indicator signal.

The means for determining the location of a color burst signal may comprise means for receiving a backporch indicator signal configured to indicate when the video signal is in the backporch region.

The means for determining the location of a color burst signal may comprise means for determining the threshold value.

The means for determining the threshold value may comprise means for determining the threshold value as half the maximum value of the sum the modulus values for the saturation and hue signal.

The means for determining the location of a color burst signal may further comprise: means for splitting the comparison indicator value signal into a determined number of parts; and means for examining at least one comparison indicator value signal to generate a counter value output.

The means for examining each comparison indicator value signal to generate a counter value output may comprise: means for incrementing the counter value output when the comparison indicator value signal indicates that the occurrence of the sum of the modulus values for the saturation and hue signals is greater than the threshold for a greater portion of the part; and means for decrementing the counter value output when the comparison indicator value signal indicates that the occurrence of the sum of the modulus values for the saturation and hue signals is less than the threshold for a greater portion of the part.

A degree of change of the counter value by the means for incrementing the counter value output and the means for decrementing the counter value output for at least one part is dependent on the ratio of the occurrence of the of the sum of the modulus values for the saturation and hue signals being greater than or less than the threshold.

The means for determining the location of a color burst signal may further comprise: means for determining the location of the color burst signal at a local maximum counter value output.

BRIEF DESCRIPTION OF THE DRAWINGS

For better understanding of the present application, reference will now be made by way of example to the accompanying drawings in which.

DETAILED DESCRIPTION OF EMBODIMENTS

The following describes in further detail suitable apparatus and possible mechanisms for the provision of video decoding.

Figure 1:
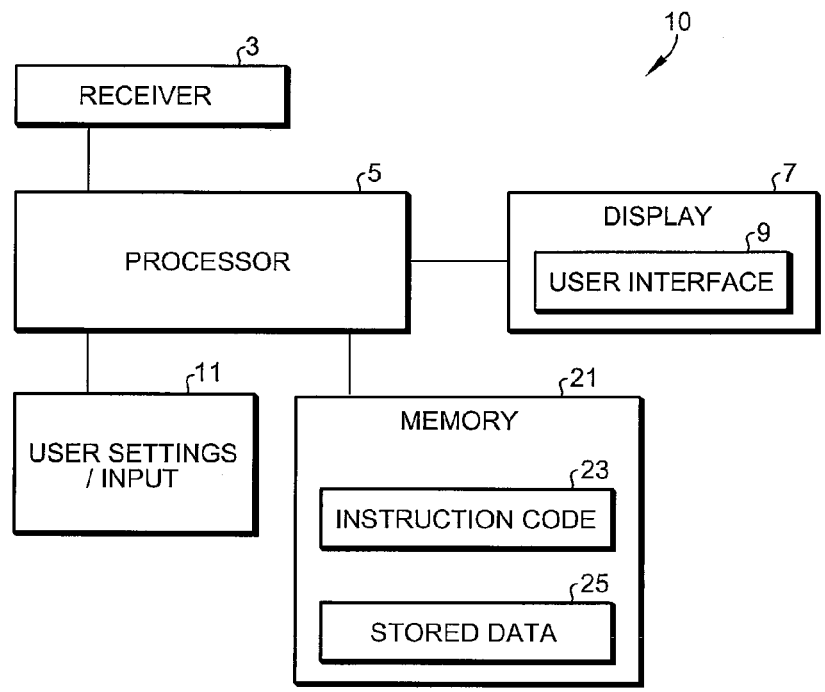
FIG. 1 shows schematically a system suitable for employing a video decoder according to some embodiments of the application.

With respect to FIG. 1, an example electronic device or apparatus 10 is shown within which embodiments of the application can be implemented.

The apparatus 10 in some embodiments comprises a receiver configured to receive a radio frequency modulated television and/or video signal and output the analog encoded video signal to the processor 5. In some embodiments the receiver can be controlled by the processor to demodulate/select the channel to be received.

The apparatus 10, in some embodiments, comprises a processor 5 which can be configured to execute various program codes. The implemented program codes can comprise video decoding for receiving the received video data and decoding and outputting the data to the display 7. The implemented program codes can be stored within a suitable memory.

In some embodiments, the processor 5 can be coupled to a memory 21. The memory 21 can further comprise an instruction code section 23 suitable for storing program codes implementable upon the processor 5. Furthermore, in some embodiments, the memory 21 can comprise a stored data section 25 for storing data, for example video data. The memory 21 can be any suitable storage means. In some embodiments the memory 21 can be implemented as part of the processor in a system-on-chip configuration.

The apparatus 10 can further comprise a display 7. The display 7 can be any suitable display means featuring technology; for example, cathode ray tube (CRT), light emitting diode (LED), variably backlight liquid crystal display (LCD), for example a LED lit LCD, organic light emitting diode (OLED), and plasma display. The display 7 can furthermore be considered to provide a graphical user interface (GUI) providing a dialog window in which a user can implement and input how the apparatus 10 displays the video. In such embodiments, the apparatus can be configured to communicate with a display remote from the physical apparatus by means of a suitable display interface. For example, the display interface can be a High Definition Multimedia Interface (HDMI) or a Digital Video Interface (DVI) or a radio frequency modulated or remodulated to be transmitted to the display.

The apparatus 10 can further comprise a user input or user settings input apparatus 11. The user input can in some embodiments be a series of buttons, switches or adjustable elements providing an input to the processor 5. In some embodiments the user input 11 and display 7 can be combined as a touch sensitive surface on the display, also known as a touch screen or touch display apparatus.

Figure 2:
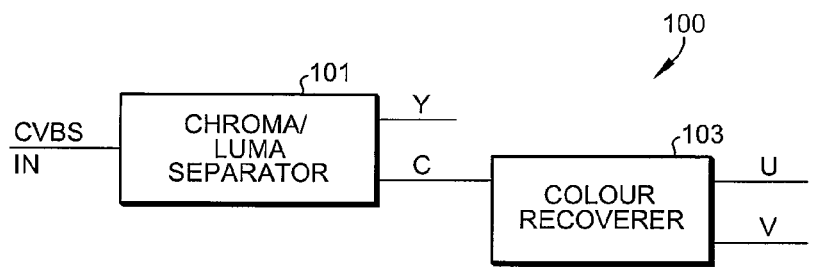
FIG. 2 shows schematically a video decoder in further detail according to some embodiments of the application.

With respect to FIG. 2, a schematic view of a video decoder 100 is shown. The video decoder 100 can in some embodiments comprise a chroma/luma separator 101. The chroma/luma separator 101 can be configured to receive the composite video broadcast signal (CVBS) or composite signal and output a brightness, luma or luminance signal Y and chrominance or chroma signal C. With respect to some embodiments of the application, the chroma or chrominance signal C can be output to a color recover or decoder.

In some embodiments, the video decoder can further comprise a color recoverer or decoder 103. The color recoverer or decoder 103 can be configured to receive the chroma or chrominance signal C and separate the signal into separate hue and saturation signals U and V. Furthermore, the color recoverer 103 or color decoder can further be in the process of generating or separating the hue and saturation signals from the chrominance signal to determine the mode or standard of the original CVBS input signal (otherwise known as the encoding modulation chrominance standard) and further perform an accurate determination of the position of the color burst.

Figure 8:
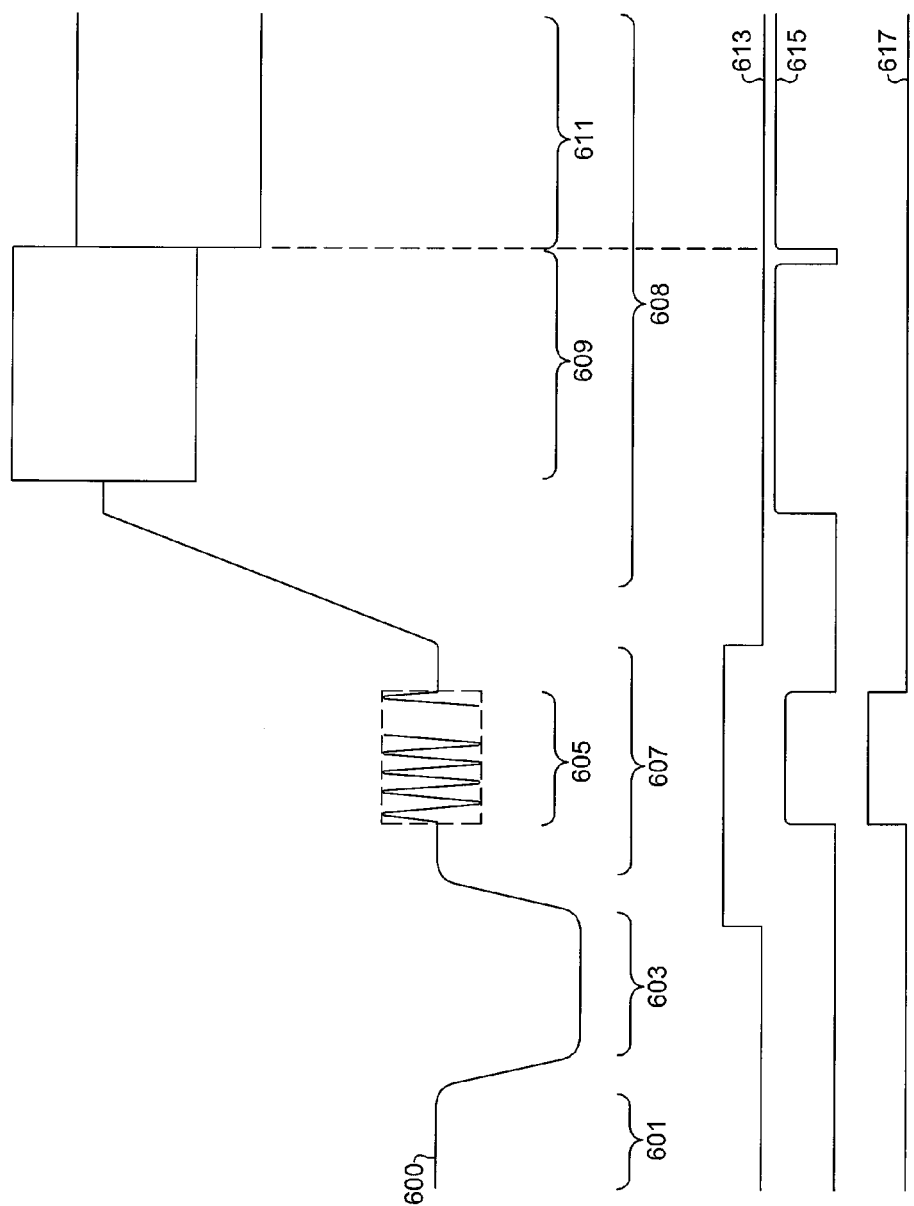
FIG. 8 shows schematically various example video signals.

With respect to FIG. 8, an example CVBS composite signal is shown. The CVBS signal 600 is shown a plot of amplitude against time for a section of a line scan. The composite video signal line scan comprises a front porch 601 region occurring before a line synchronization portion 603 configured to indicate the start of a new line scan, followed by a back porch 607 region, followed by the line information region 608 configured to carry the luma and chroma information. The back porch region 607 has located at some designated time the color burst region 605. The color burst region 605 can be used by the video decoder 100 to determine a sub-carrier frequency reference which can, for example, be used to demodulate the chroma or color information stored within the line information section 608.

The line information region 608 can be seen to be divided into pixel or pixel block regions. FIG. 8 shows two pixels, a first pixel 609 and a second pixel 611. Each pixel region is encoded both the luma (brightness) and chroma (color) information.

Figure 3:
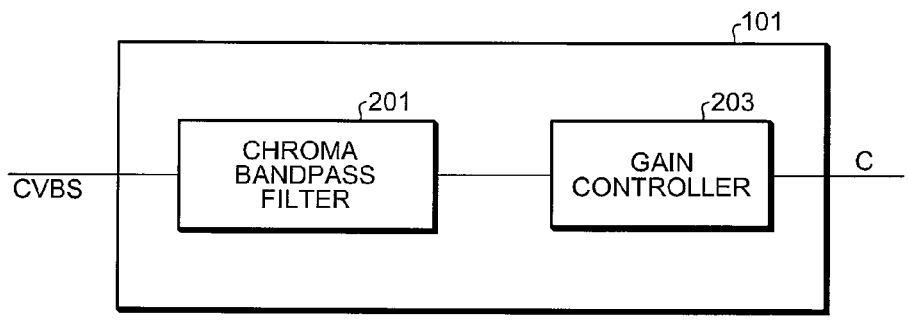
FIG. 3 shows schematically a chroma separator in further detail according to some embodiments of the application.
Figure 9:
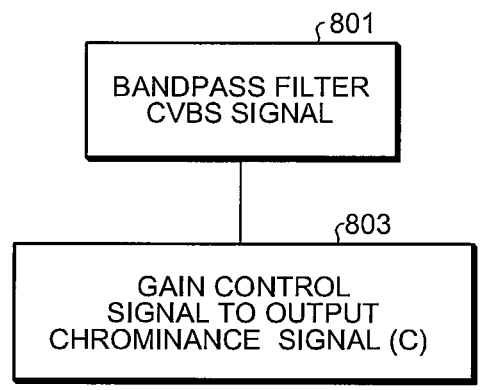
FIG. 9 shows a method of operating the chroma separator according to some embodiments of the application.

With respect to FIG. 3, a chroma/luma separator 101 is shown in further detail, the operation of which is shown with respect to FIG. 9. In this example, the chroma/luma separator 101 shows the outputting of the chrome signal but it would be understood that a luma signal can be separated and output according to any suitable known method.

The chroma/luma separator 101 can in some embodiments comprise a chrome band pass filter 201. The chrome band pass filter 201 is configured to filter the CVBS input signal to pass the color modulated signals and reject or block the lower/upper frequency luma values. The output of the chrome band pass filter 201 can be passed in some embodiments to the gain controller 203.

The operation of band pass filtering in the CVBS signal is shown in FIG. 9 by step 801.

In some embodiments, the chroma/luma separator 101 comprises a gain controller 203. The gain controller 203 can be configured to receive the band pass filtered chroma signals and perform an automatic gain control and/or DC balancing operation on the band pass filtered signals to output a corrected bias voltage chrome signal. The gain controller can output the chrome signal to the color recoverer 103.

The operation of performing gain control on the filtered signal to output a chroma (or chrominance) signal C is shown in FIG. 9 by step 803.

Figure 4:
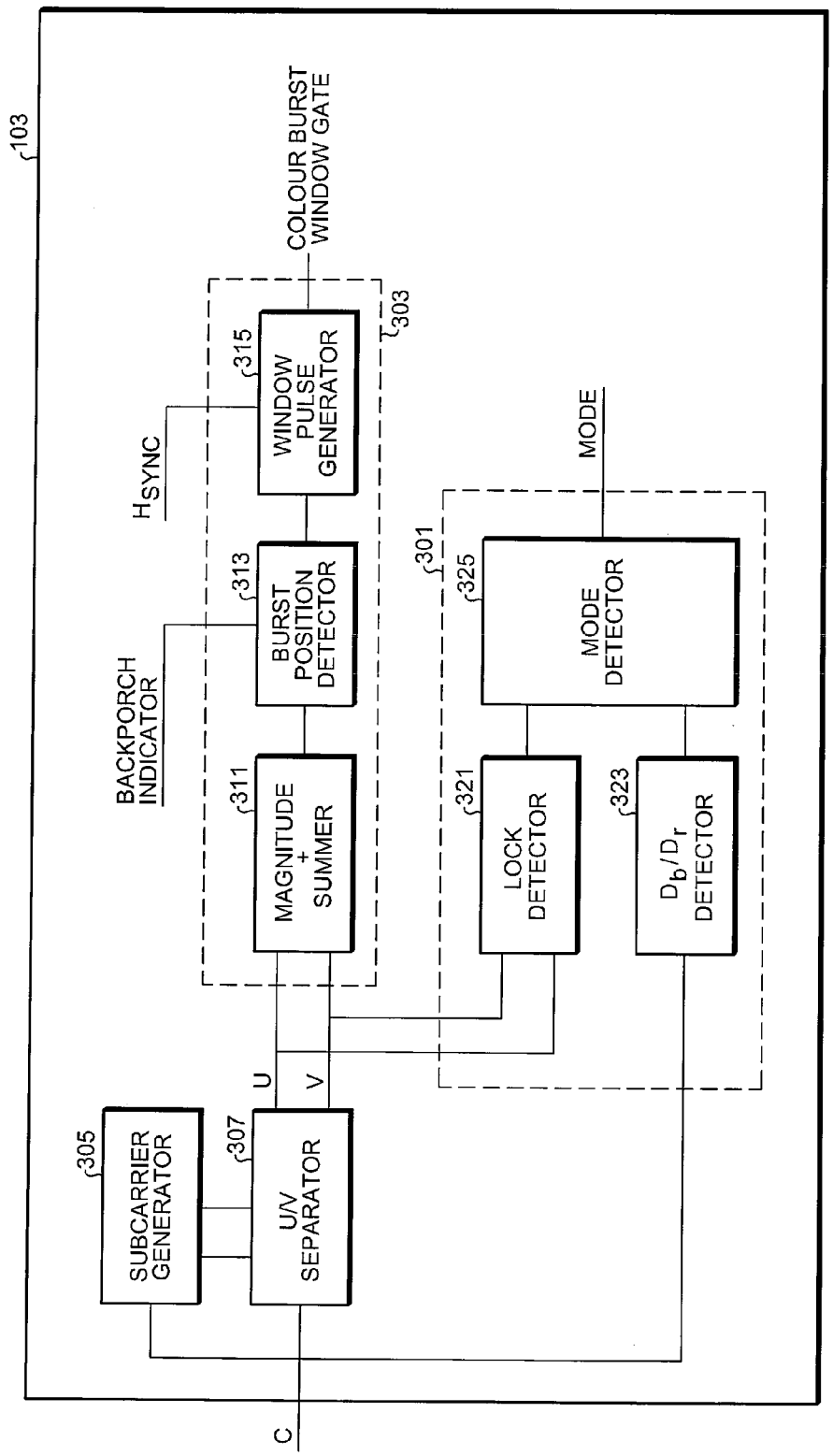
FIG. 4 shows schematically a chroma decoder in further detail according to some embodiments of the application.

With respect to FIG. 4, the color recoverer/decoder 103 is shown in further detail. It would be understood that the color recoverer/decoder can perform and comprise further elements related to color video decoding. However, in the following description we describe the elements associated with embodiments of the application to simplify the description.

In some embodiments the color recoverer/decoder comprises a U/V separator or decoder 307. The U/V separator or decoder 307 is configured to receive the chrome signal and output separated U and V signals. The U/V separator 307 can be configured to receive further inputs; for example, a sub-carrier signal, and/or a color burst window gate signal, a mode determination signal, or any other suitable input to assist the separation of the U/V signals from the input chroma signals.

Furthermore, the color recoverer/decoder 103 can, in some embodiments, comprise a subcarrier generator 307, configured to receive the chroma signal and from the chrome signal generate (or regenerate) the subcarrier information. In some embodiments, as discussed herein, the subcarrier signal can be passed to the U/V separator to assist in demodulating the chroma signal into the associated U and V signals.

Figure 10:
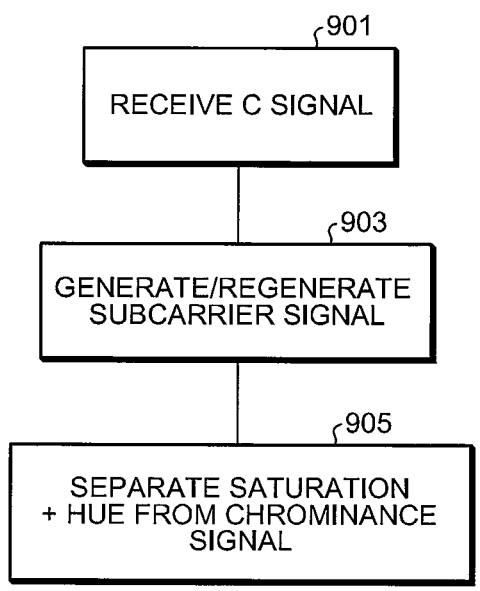
FIG. 10 shows a method of operating the chroma decoder according to some embodiments of the application.

The operation of receiving the chroma signal at the U/V separator 307 and subcarrier generator 305 is shown in FIG. 10 by step 901.

The operation of generating or regenerating the subcarrier signal is shown in FIG. 10 by step 903 and the operation of separating the saturation and hue from the chrominance input signal is shown in FIG. 10 by step 905.

Figure 5:
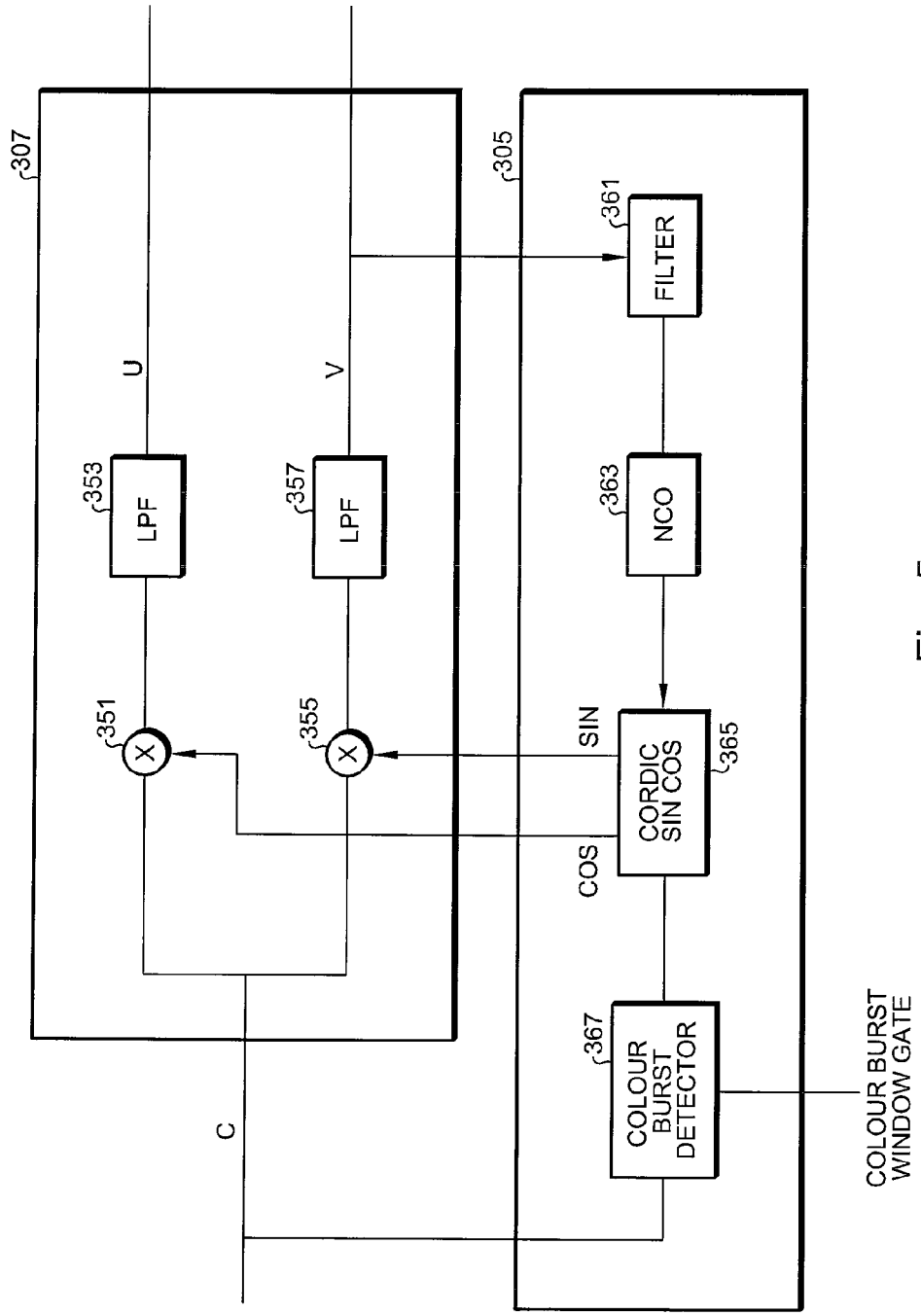
FIG. 5 shows schematically a subcarrier generator and U/V separator in further detail according to some embodiments of the application.

With respect to FIG. 5, an example U/V separator 307 and an example sub-carrier generator 305 are shown in further detail.

In the following example, the U/V separator is configured to operate in a PAL mode and determine whenever the detected input signal line system belongs 625 line system and the subcarrier frequency is approximately or near 4.43 MHz (rather than the NTSC 525 line subcarrier frequency approximately or near 3.58 MHz); however, it would be understood that based on the output of the mode determiner or in some embodiments a user or semi-automatic user selection input the U/V separator can be configured to separate the U/V signal in any suitable way. In some embodiments, the default (or power-up) mode is NTSC.

The U/V separator 307 in some embodiments comprises a first mixer or multiplier 351 configured to mix the chroma signal with a first subcarrier signal; for example, the cosine representation of the subcarrier signal. The output of the first mixer 351 can be output to a first low pass filter 353.

In some embodiments, the U/V separator 307 can comprise a first low pass filter 353 configured to low pass filter the output of the first mixer 351 to generate the first signal output component U.

Furthermore, in some embodiments, the U/V separator 307 can be configured to comprise a second mixer 355 configured to mix the chroma signal with a second sub-carrier component; for example, the sinusoidal or $\pi/2$ phase shifted version of the first subcarrier signal, and output the mixed signal to a second low pass filter 357.

In some embodiments, the U/V separator 307 can be configured to comprise a second low pass filter 357 configured to receive the output of the second mixer 355 and output the second color signal component V. Furthermore, in some embodiments, the output of one or other of the U or V signals can be passed to the subcarrier generator.

The subcarrier generator 305 can in some embodiments comprise a color burst detector 367 configured to receive the chroma signal containing the color burst component and from the color burst component determine the subcarrier frequency and phase reference information. This subcarrier frequency and phase information can, in some embodiments, be passed to an oscillator; for example, a coordinate rotation digital computer (cordic) sinusoid generator.

In some embodiments, the color burst determiner 367 can further be controlled based on a color burst window gate window generated by a color burst window gate generator.

Further, the subcarrier generator 305 can, in some embodiments, comprise a phase locked loop configured to determine and track the oscillation of the U or V signals. The subcarrier generator 305 can therefore in some embodiments comprise a filter 361 configured to receive the output of either the U or V signals, filter the received U or V output, and pass it to a numerically controlled oscillator (NCO) 363. The subcarrier generator 305 furthermore in some embodiments comprises a numerically controlled oscillator (NCO) 363. The NCO 363 can be any suitable stable NCO 363 configured to generate an oscillator value which can be output to the cordic subcarrier generator 365.

The subcarrier generator 305 can furthermore comprise a coordinate digital computer (CORDIC) configured to receive the NCO output and output a sinusoidal and cosine version of the oscillator frequency (in other words $\pi/2$ phase difference versions of the same frequency oscillation). The oscillator outputs can, as discussed herein, be passed to the U/V separator 307 where they mix/demodulate the chroma signal into hue and saturation signals.

In some embodiments, as shown with respect to FIG. 4, the color recover/decoder 103 can comprise a mode determiner 301. The mode determiner 301 can, in some embodiments, comprise a PAL lock detector 321 configured to receive the U and V signals generated by the U/V separator 307. The operation of the mode determiner according to some embodiments can be shown with respect to FIG. 11.

Figure 11:
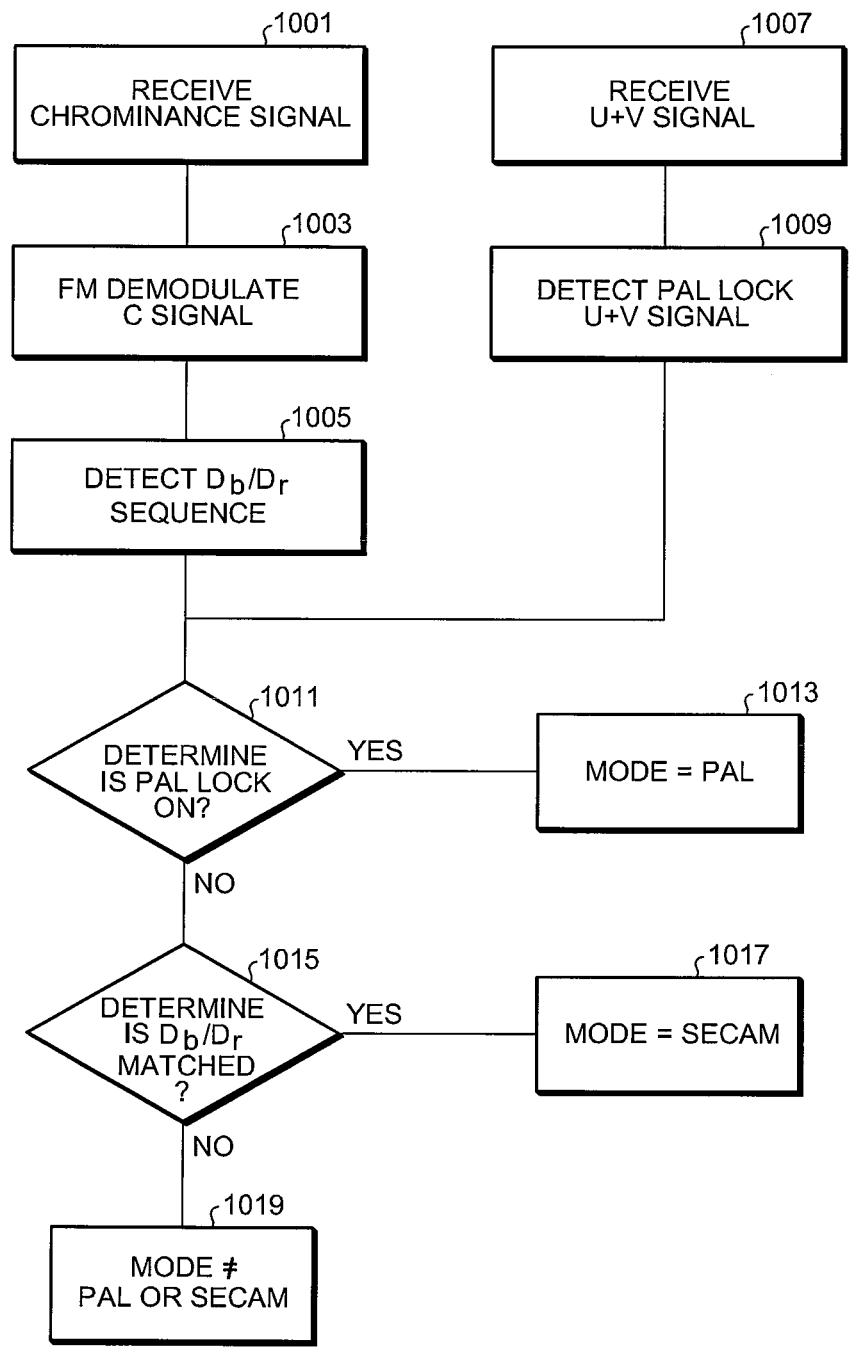
FIG. 11 shows a method of operating the mode determiner according to some embodiments of the application.

The receiving of the U and V signals at the mode determiner and PAL lock detector is shown in FIG. 11 by step 1007.

The PAL lock detector 321 can in some embodiments determine whether or not a PAL phase lock between the U and V signals is apparent and pass this determination to a mode detector.

The determination or detection of a PAL lock on the U and V signals is shown in FIG. 11 by step 1009.

Furthermore, in some embodiments, the mode detector comprises a $D_b/D_r$ matcher 323. The $D_b/D_r$ matcher 323 is configured to determine whether the chroma signal has matched $D_b$ and $D_r$ components such as found in SECAM system signals.

Figure 7:
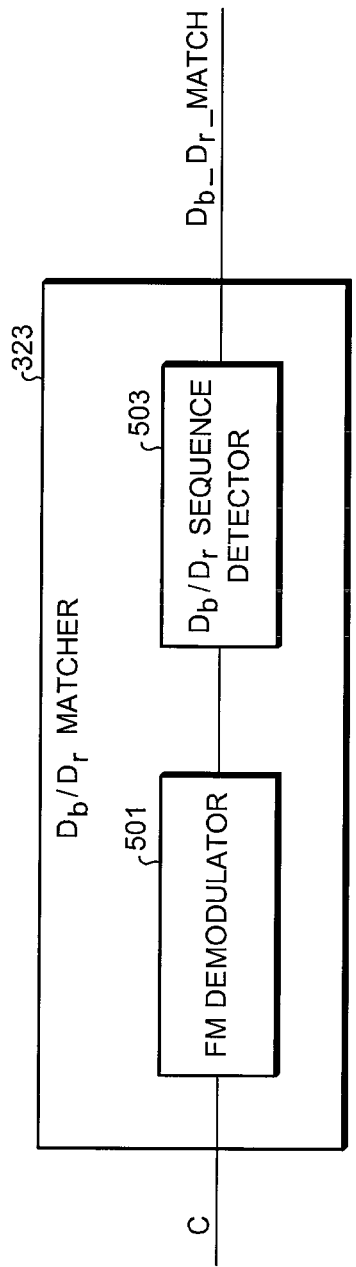
FIG. 7 shows schematically a $D_b/D_r$ matcher in further detail according to some embodiments of the application.

The $D_b/D_r$ matcher 323 is shown in further detail in FIG. 7. The matcher 323 can comprise, in some embodiments, a FM demodulator 501 configured to receive the chroma signal and FM demodulate the chroma signal according to known SECAM modulation techniques.

The operation of receiving the chroma signal is shown in FIG. 11 by step 1001.

The operation of frequency modulation demodulating the chroma signal is shown in FIG. 11 by step 1003.

The output of the FM demodulator 501 can, in some embodiments, be passed to a sequence detector 503. The sequence detector 503 is configured to determine whether the output (frequency modulated) demodulated signal has matched $D_b$ and $D_r$ sequences as would be used in a SECAM system video chroma signal.

The operation of detecting a $D_b$ and $D_r$ match sequence is shown in FIG. 11 by step 1005.

The sequence detector or determiner can in some embodiments pass a $D_b/D_r$ match signal to the mode detector 325.

In some embodiments, the mode determiner 301 comprises a mode detector 325 configured to receive the outputs of the lock detector 321 and the sequence matcher 323 and output a mode information signal. The mode selector 325 can, in some embodiments, be a state machine configured to produce an output dependent on the input values. In some embodiments, the mode selector 325 can be configured to determine whether the PAL lock is on.

The operation of the state machine determining whether the PAL lock is on is shown in step 1011 of FIG. 11.

If the PAL lock is determined to be on, the mode detector is configured to generate mode output signal to indicate that a PAL signal has been received.

The operation of outputting a PAL signal indicator is shown in FIG. 11 by step 1013.

If the PAL lock is not detected, then the mode detector 325 determines whether or not the $D_b/D_r$ signal components are matched. The checking operation determining whether $D_b/D_r$ matches is shown in step 1015 of FIG. 11.

Where there is a detected $D_b/D_r$ match, and the PAL lock is not on (in other words the PAL lock is off), then the mode detector 325 can be configured to output a mode indicator determining the received CVBS signal mode is SECAM.

The operation of outputting a SECAM signal indicator is shown in FIG. 11 by step 1017.

Where the PAL lock is determined to be off and there is a no $D_b/D_r$ sequence match, the mode detector 325 and therefore the mode determiner 301 can then output an indicator indicating that the mode is neither PAL nor SECAM.

The operation of outputting the input signal mode not being equal to PAL or SECAM is shown in FIG. 11 by step 1019.

Thus, in such embodiments, the mode detection uses two stage detection which reduces the chances of PAL being misdetected and enables a more accurate color demodulation process to be carried out by the U/V separator 307 as the U/V separator can be configured to or operate to decode the input CVBS signal dependent on which broadcast system is being received in a more efficient manner. Furthermore, the mode determiner is less prone to errors as the probability of PLL locking to non-PAL signals is very rare, because the phase lock loop block continuously attempts to lock the locally generated subcarrier to the input color burst.

Figure 12:
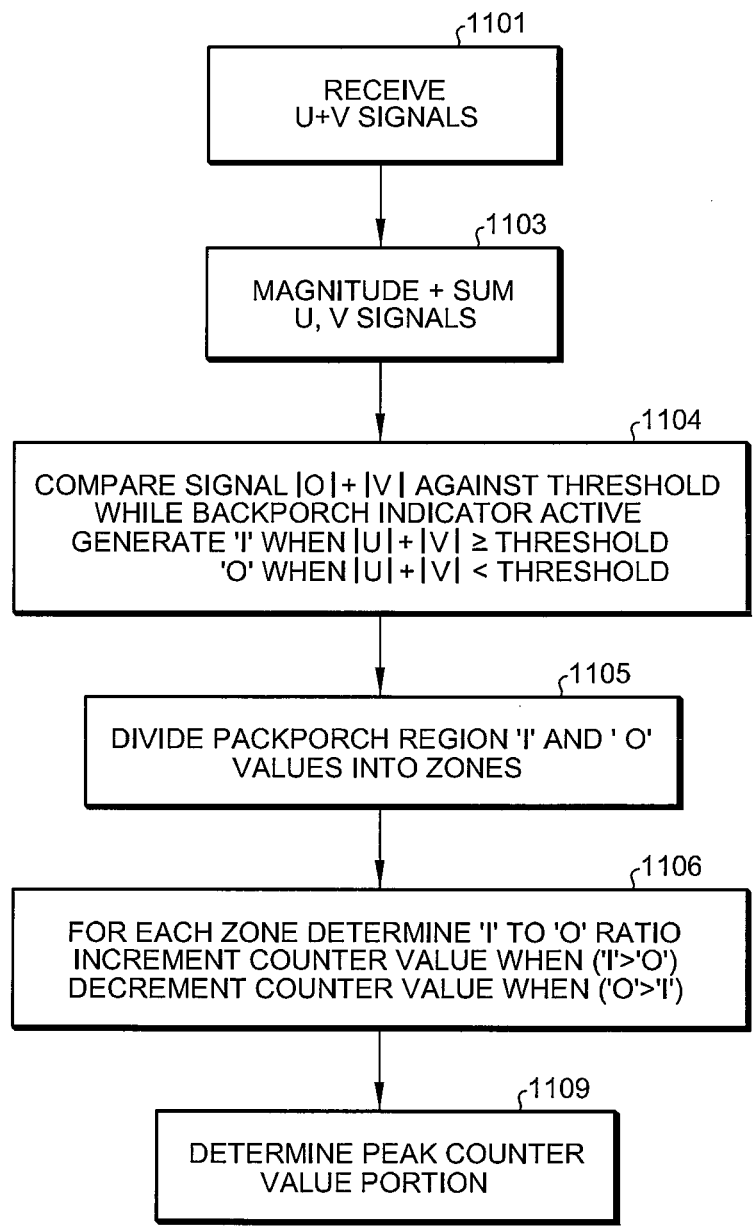
FIG. 12 shows a method of operating the burst position detector according to some embodiments of the application.

As shown with respect to FIG. 4, the color recoverer/decoder can further comprise a color burst window gate determiner 303. The operation of the color burst window gate determiner 303 according to some embodiments is shown in FIG. 12. The color burst window gate determiner can be configured to output an indication of when the color burst has been received and thus enable the subcarrier generator 305 to accurately determine the color burst frequency and phase information.

In other words, by generating a more accurate window pulse it can improve not only the color burst frequency measurement, but also other characteristic values used in the decoding of CVBS signals such as: PAL V switch usage, the NCO subcarrier locking to 4 Fsc frequency, the subcarrier presence check, SECAM detection, $D_b/D_r$ detection, and also chroma demodulation.

Furthermore, the color burst window gate can also be used to detect the input video mode; for example, as described herein, by enabling an accurate $D_b/D_r$ signature/pattern detection.

The color burst window gate determiner 303 can, in some embodiments, comprise a U and V signal magnitude and summer 311. The U and V signal magnitude and summer 311 can be configured to receive the U and V signals generated by the U/V separator 307, determine the magnitude of each (in other words, determining the modulus of each of the U and V signals and sum the modulus values of U and V). The output of the U and V signal magnitude and summer 311 can then, in some embodiments, be passed to a burst position detector 313.

The operation of receiving the U and V signals is the color burst window gate determiner shown in FIG. 12 by step 1101.

Furthermore, the determination of the magnitude of the U and V signals and summing the magnitude of the U and V signals is shown in FIG. 12 by step 1103.

The color burst window gate determiner 303 can, furthermore, in some embodiments, comprise a burst position detector 313. The burst position detector 313 can be configured to receive the output of the U and V signal magnitude and summer 311. In some embodiments, the first burst position detector 313 can be configured to receive a back porch indicator flag or signal. With respect to FIG. 8, the back porch indicator signal is shown with reference to the CVBS signal. The back porch indicator signal 613 can be generated by a back porch detector (not shown) configured to determine when the CVBS signal is in the "back porch" region of the signal. As shown in FIG. 8, the back porch indicator signal 613 during the back porch portion of the CVBS signal has a first (high) value and a second (low) value otherwise.

Furthermore, with respect to FIG. 8, the output of the magnitude and sum block output signal 311 is shown contemporaneously with the CVBS line signal 600 and the back porch indicator signal 613 as the signal 615 which shows the color burst blocks peak values.

Figure 6:
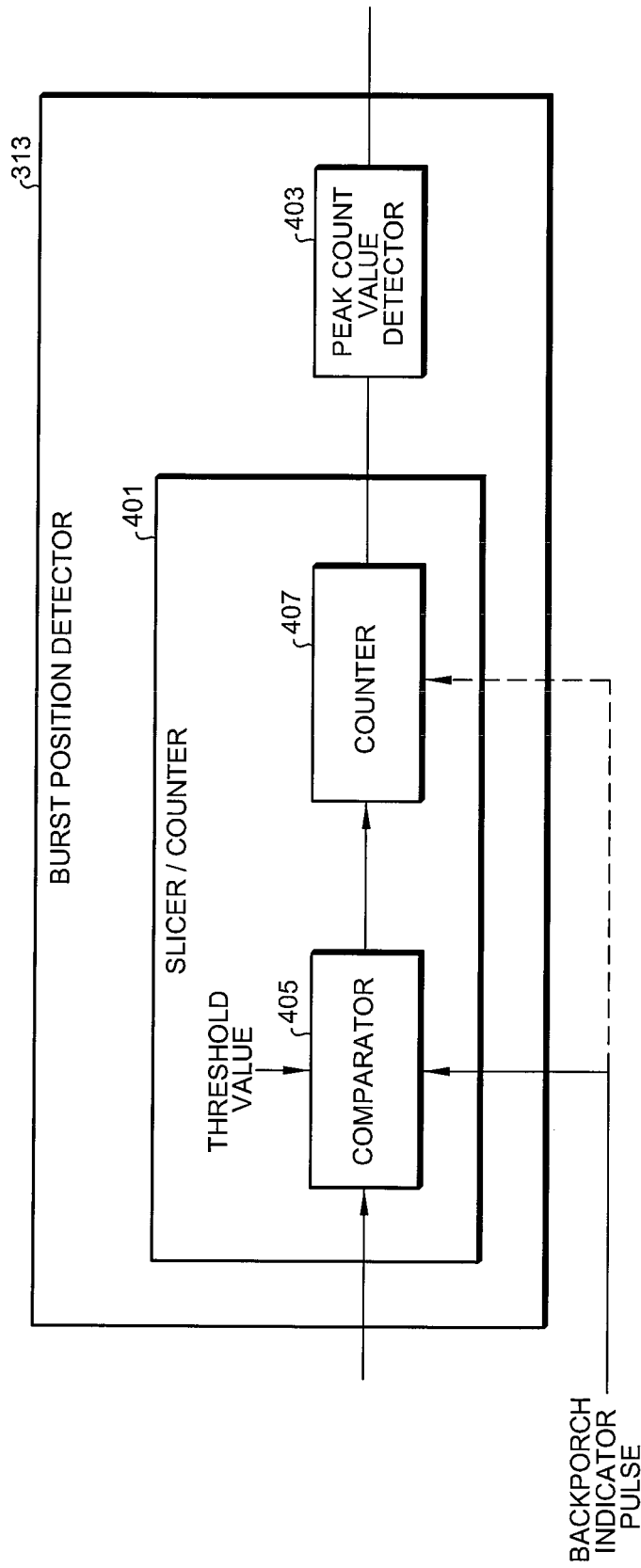
FIG. 6 shows schematically a burst position detector in further detail according to some embodiments of the application.

With respect to FIG. 6, the burst position detector 313 is shown in further detail. The burst position detector 313 can, in some embodiments, comprise a slicer/counter 401 configured to receive the output of the U and V signal magnitude and summer 311 and the back porch indicator pulse. The slicer/counter 401 can in some embodiments comprise a comparator 405. The comparator 405 can be configured to compare the output of the magnitude and summer 311 (in other words the |U|+|V| signal) against a threshold value and return a value of '1' or '0' depending on the result of the comparison.

In some embodiments, the threshold value can be determined as 50% of the peak/maximum value of |U|+|V|.

The comparator 405 can then, in some embodiments, be configured to selectively output the comparison result. For example, the returned comparison value can be 'AND'ed with the backporch indicator pulse signal and the resultant signal passed to a counter 407. In other words, the comparator 405 output is valid only for the duration of backporch indicator pulse.

The operation of comparing the |U|+|V| signal value against the threshold is shown in FIG. 12 by step 1104.

The slicer 401 can furthermore comprise a counter 407. The counter 407 can be configured to divide the comparator 405 output signal into a determined number of time portions starting from the start of backporch indicator pulse signal. For example, in some embodiments, the counter can be configured to divide the comparator 405 output into 8 zones/portions/bins, each zone being 16 clock cycles long (4 color burst cycles long).

The operation of dividing the backporch region compares |U−+|V| signal values (the returned '0' and '1' values into zones is shown in FIG. 12 by step 1105).

The counter 407 can furthermore be configured to, for each zone, count the number of 1's and 0's from the comparator. The counter 407 can then be configured to increment a counter value when there are more 1's than 0's for the zone and furthermore to decrement the counter value when there are more 0's than 1's. In some embodiments, the increment or decrement step-size (in other words the rate of incr/decr) depends on the ratio of 1's to 0's within each zone.

For example, when all 16 samples are 1's the counter increments with biggest step-size. When the counter determines that the number of 1's and 0's from the comparator are the same within a zone, this implies an uncertain situation, and the counter can be configured to maintain the counter value and not perform either an increment or decrement. When the counter determiners that all 16 samples are 0's, the counter can be configured to decrement the counter value by the biggest step size. It would be understood that more 1's indicate presence of color-burst, whereas, more 0's indicate the absence of color-burst and zones with both 1's and 0's can indicate noisy/uncertain situations.

The operation of incrementing or decrementing the counter value by the ratio of 0's and 1's within a zone is shown in FIG. 12 by step 1106.

The output of the counter can be passed to a jitter or noise removal logic 403.

In some embodiments, the first position detector 313 can comprise a peak count value determiner 403. The peak count value determiner 403 can be configured to determine the position of the color burst where the counter reaches its maximum value within the search window and output a filtered window output which is active during the peak count value zone and/or zones.

The operation of determining the peak counter value portion is shown in FIG. 12 by step 1109.

Figure 13A:
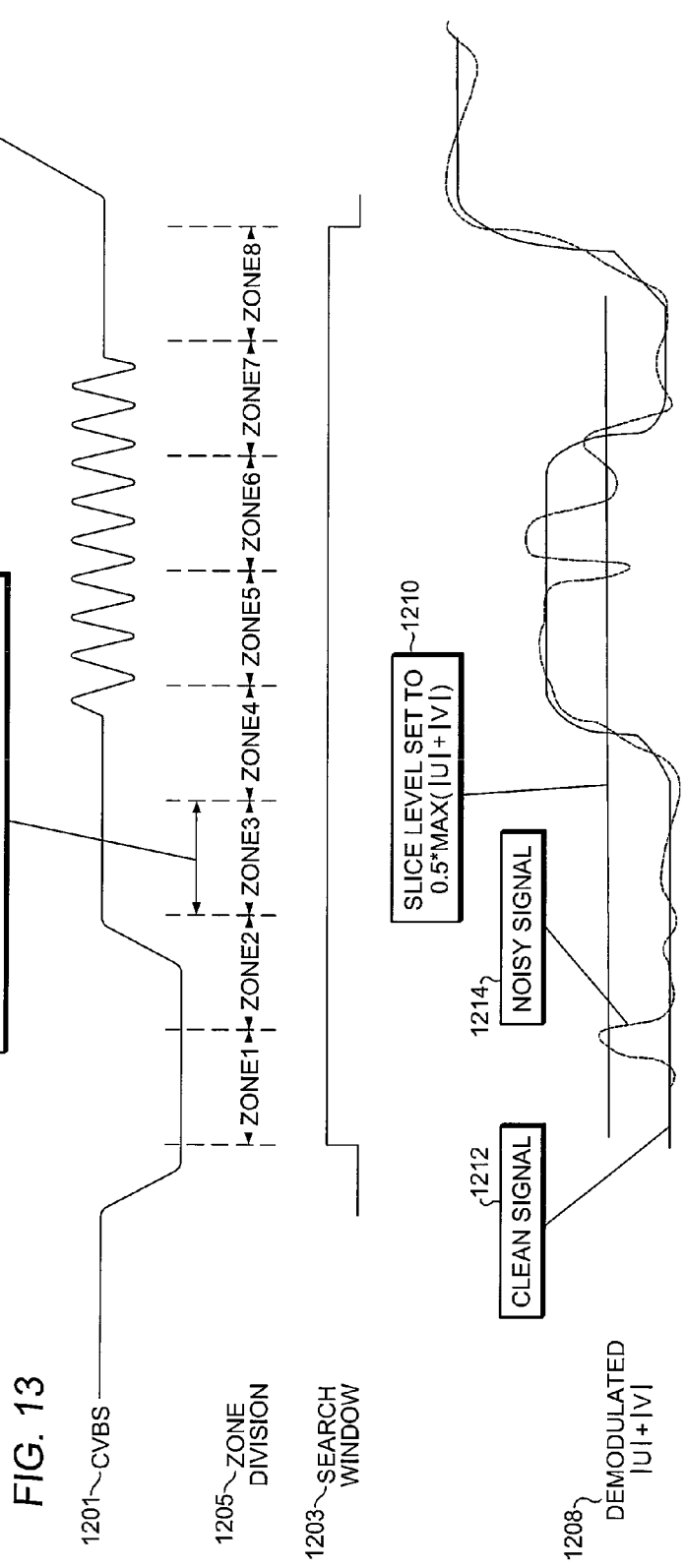
FIG. 13 shows example timing diagram showing the operation of the burst position detector according to some embodiments of the application.
Figure 13B:
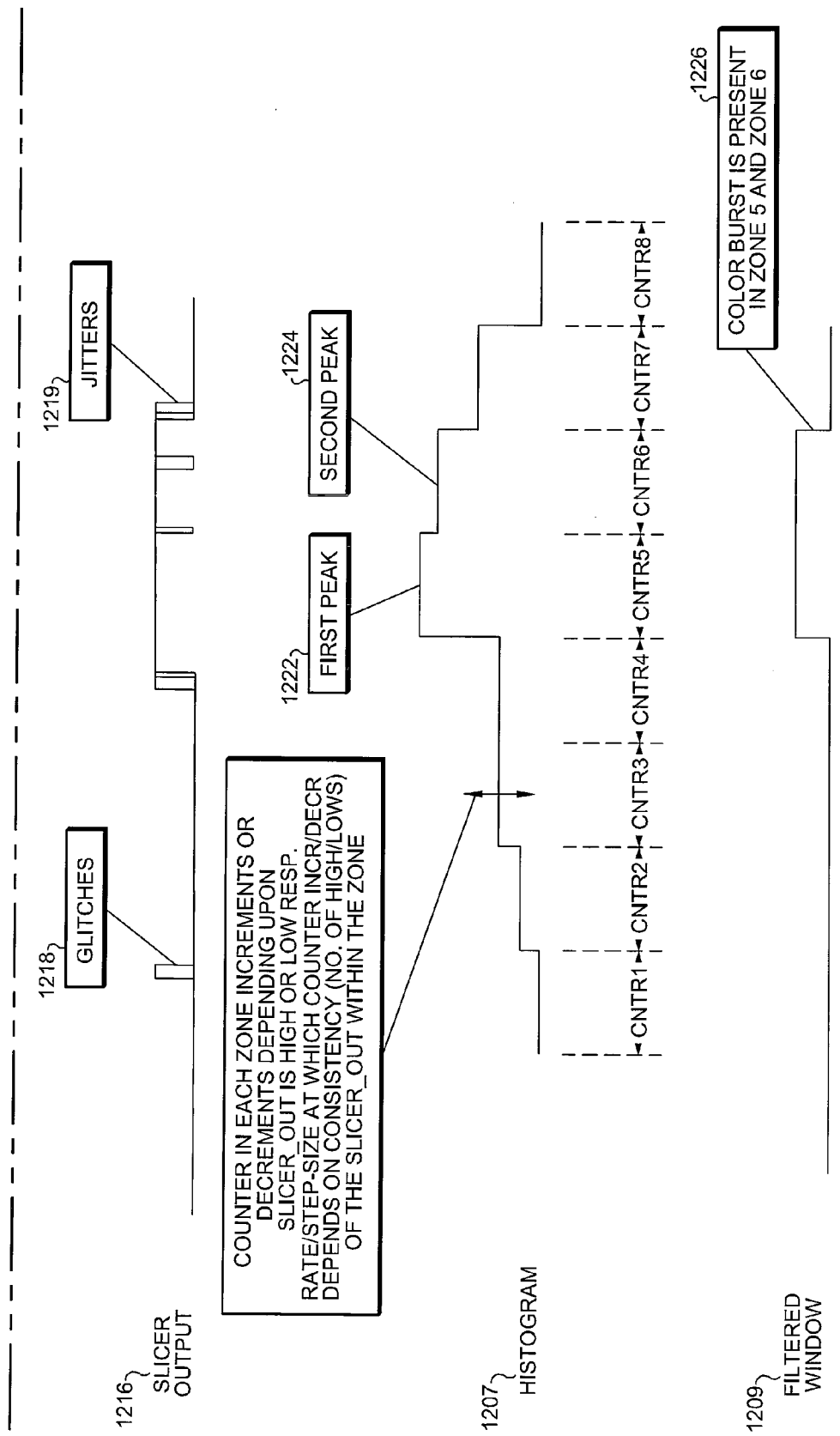

This, for example, can be shown in FIG. 13 where an example CVBS signal 1201 for a part of a line signal is shown. Furthermore, FIG. 13 shows the search window 1203 signal (in other words the back porch indicator pulse signal) which is active for the backporch region. FIG. 13 also shows the search window divided into zones or portions 1205. In this example, there are 8 zones or portions and each is 16 clock cycles wide (in other words, 4 color bursts wide).

FIG. 13 furthermore shows an example of a clean or ideal demodulated |U|+|V| signal 1212 which, as expected, has a low level up to color burst region and then a further low level up to the line data section of the CVBS signal. An example real world or noisy demodulated |U|+|V| signal 1214 is also shown by the faint dotted trace. It can be seen that the difference between the clean 1212 and noisy 1214 signal can in some embodiments be significant. Alongside the clean 1212 and noisy 1214 signal is shown the threshold or slice level signal 1210, which in this example is 0.5*max(|U|+|V|).

The comparator or slicer output signal 1216 is also shown in FIG. 13 with respect to the returned values dependent on the comparison between the threshold signal and the clean and noisy signals. The comparison return signal between the clean and threshold signals is shown as the solid trace and the noisy and the threshold signals is shown as the dotted trace. The difference between the two comparison outputs can be seen as glitches 1218 where the real or noisy signal comparison produces a temporary incorrect value, and jitters 1219 where the real or noisy signal comparison causes the comparator to continue to output a value which is incorrect for a short period.

Furthermore, the counter value or the histogram 1207 showing the output of the counter is shown in FIG. 13. It can be seen that there is a small increment where the glitch 1218 is determined; however, when the color burst region is entered and the slicer output consistently outputs 1's then the counter value increases significantly to reach the peak value, such as the first peak 1222 in zone 5 and the second peak 1224 in zone 6.

The output or 'filtered' window showing the greatest value of the histogram 1209 is also shown where; for the example, the active output region 1226 of the output window is shown occurring in zone 5 and zone 6 of the search window.

This tracking of values implementation to determine the color burst position in embodiments of the application enables a more robust detection as it is possible to achieve a subcarrier lock and show correct colors for a wider range of color burst position variations, typically from −3 microseconds to +3 microseconds, though the range can be extended invariably by adding more zones/bins which would require more hardware/computation blocks. This helps support a wider range of $H_{sync}$ position variation as well.

In some embodiments, the search window can be shortened to restrict the color burst position detection range or lengthened subject to a maximum of 8 zones (as shown in the examples described herein). The increment/decrement stepsize/rate for each combination can be programmed or determined in such a way to trade-off between determining the color burst speed and robustness. By nature of the method shown herein (the application of the algorithm), for clean or near clean received signals, the zone counter reaches the peak value very fast and for noisy signals reaches the peak more slowly, which is attributed to the provision of different stepsize for different ratios of comparison 1's and 0's within a zone. Hence, for clean signals, the color burst position can be detected faster; whereas, for noisy signals, the color burst position is detected slowly but more robustly.

The output of the burst position detector 313 can further be passed to a window pulse generator 315. The window pulse generator 315, in some embodiments, receives the burst position detection and also the horizontal synchronization indicator and as such can stabilise the window pulse signal with respect to the horizontal synchronization pulse value. The generated window pulse signal can be delayed by an adjustable/programmable amount as required by the recipient/target blocks.

The embodiments of this application may be implemented by computer software executable by a data processor of the mobile device, such as in the processor entity, or by hardware, or by a combination of software and hardware. Further, in this regard, it should be noted that any blocks of the logic flow as in the Figures may represent program steps, or interconnected logic circuits, blocks, and functions, or a combination of program steps and logic circuits, blocks and functions. The software may be stored on such physical media as memory chips, or memory blocks implemented within the processor, magnetic media such as hard disks or floppy disks, and optical media such as, for example, DVD and, the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the application may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like), may be transmitted to a semiconductor fabrication facility or "fab" for fabrication.

It would be understood that some embodiments of the application may be practiced in a television receiver comprising the video decoder as discussed herein. Similarly, in some embodiments of the application can be practiced in a video player comprising the video decoder as discussed herein.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The foregoing description has provided by way of exemplary and non-limiting examples a full and informative description of the exemplary embodiment of this invention.

However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. A video decoder comprising:
   a hue and saturation separator configured to demodulate from a component video signal chroma signal: a hue signal and a saturation signal; and
   a video signal determiner configured to determine at least one video signal characteristic of the component video signal dependent on the hue and saturation signal,
   wherein the video signal determiner comprises a mode determiner configured to determine an encoding standard of the video signal,
   wherein the mode determiner comprises:
   a signal lock detector configured to determine when a phase alternating line phase lock occurs between the hue signal and saturation signal;
   a sequence matcher configured to receive the video signal chroma signal and determine when a $D_b$ and $D_r$ sequence from the chroma signal match; and
   an encoding mode selector configured to output an encoding standard indicator dependent on the signal lock detector and sequence matcher, and
   wherein the encoding mode selector is configured to output an unknown encoding standard indicator when the signal lock detector fails to determine the hue signal and the saturation signal are phase locked and the sequence matcher fails to determine the $D_b$ and $D_r$ sequence from the chroma signal match.

2. The video decoder as claimed in claim 1, wherein the encoding mode selector is configured to output a phase alternating line encoding standard indicator when the signal lock detector determines the hue signal and the saturation signal are phase locked.

3. The video decoder as claimed in claim 1, wherein the encoding mode selector is configured to output a SECAM encoding standard indicator when the signal lock detector fails to determine the hue signal and the saturation signal are phase locked and the sequence matcher determines the $D_b$ and $D_r$ sequence from the chroma signal match.

4. The video decoder as claimed in claim 1, wherein the video signal determiner comprises a color burst determiner configured to determine a location of a color burst signal within the video signal.

5. The video decoder as claimed in claim 4, wherein the color burst determiner comprises:
   an absolute value determiner configured to sum the modulus values for the saturation and hue signals; and
   a burst position determiner configured to determine the color burst location dependent on the summed modulus values for the saturation and hue signals.

6. The video decoder as claimed in claim 5, wherein the color burst determiner further comprises a burst position indicator generator configured to output an indicator value relative to a horizontal synchronization signal.

7. The video decoder as claimed in claim 5, wherein the burst position determiner comprises a comparator configured to compare the sum of the modulus values for the saturation and hue signals against a threshold value and return a comparison indicator value.

8. The video decoder as claimed in claim 7, wherein the comparator is configured to output the comparison indicator dependent on a backporch indicator signal.

9. The video decoder as claimed in claim 8, wherein the burst position determiner is configured to receive a backporch indicator signal configured to indicate when the video signal is in the backporch region.

10. The video decoder as claimed in claim 7, wherein the burst position determiner comprises a threshold determiner configured to determine the threshold value.

11. The video decoder as claimed in claim 10, wherein the threshold determiner is configured to determine the threshold value as half the maximum value of the sum the modulus values for the saturation and hue signal.

12. The video decoder as claimed in claim 7, wherein the burst position determiner further comprises:
    a splitter configured to split the comparator comparison indicator value signal into a determined number of parts; and
    a counter configured to examine at least one part comparator comparison indicator value signal and generate a counter value output.

13. The video decoder as claimed in claim 12, wherein the counter is further configured to:
    increment the counter value output when the comparator comparison indicator value signal indicates that the occurrence of the sum of the modulus values for the saturation and hue signals is greater than the threshold for a greater portion of the part; and
    decrement the counter value output when the comparator comparison indicator value signal indicates that the occurrence of the sum of the modulus values for the saturation and hue signals is less than the threshold for a greater portion of the part.

14. The video decoder as claimed in claim 13, wherein the degree of change of the counter value output for at least one part is dependent on the ratio of the occurrence of the sum of the modulus values for the saturation and hue signals greater than or less than the threshold.

15. A television receiver comprising the video decoder as claimed in claim 1.

16. An integrated circuit comprising the video decoder as claimed in claim 1.

17. A video player comprising the video decoder as claimed in claim 1.

18. A method of decoding video signals comprising:
    demodulating from a component video signal chroma signal: a hue signal, and a saturation signal; and
    determining at least one video signal characteristic of the component video signal dependent on the hue and saturation signal,
    wherein determining at least one video signal characteristic of the component video signal dependent on the hue and saturation signal comprises determining an encoding standard of the video signal,
    wherein determining at least one video signal characteristic of the component video signal dependent on the hue and saturation signal comprises:
    determining when a phase alternating line phase lock occurs between the hue signal and saturation signal;
    receiving the video signal chroma signal and determining when a $D_b$ and $D_r$ sequence from the chroma signal match; and
    outputting an encoding standard indicator dependent on the condition of the signal lock and sequence match, and
    wherein outputting an encoding standard indicator dependent on the condition of the signal lock and sequence match comprises outputting an unknown encoding standard indicator when the hue signal and the saturation signal are not phase locked and the $D_b$ and $D_r$ sequence from the chroma signal are not matched.

19. The method as claimed in claim 18, wherein outputting an encoding standard indicator dependent on the condition of the signal lock and sequence match comprises outputting a phase alternating line encoding standard indicator when the hue signal and the saturation signal are phase locked.

20. The method as claimed in claim 18, wherein outputting an encoding standard indicator dependent on the condition of the signal lock and sequence match comprises outputting a SECAM encoding standard indicator when the hue signal and the saturation signal are not phase locked and the $D_b$ and $D_r$ sequence from the chroma signal match.

21. The method as claimed in claim 18, wherein determining at least one video signal characteristic of the component video signal dependent on the hue and saturation signal comprises determining a location of a color burst signal within the video signal.

22. The method as claimed in claim 21, wherein determining the location of a color burst signal within the video signal comprises:
   summing the modulus values for the saturation and hue signals; and
   determining the color burst location dependent on the summed modulus values for the saturation and hue signals.

23. The method as claimed in claim 22, wherein determining the location of a color burst signal within the video signal further comprises outputting a color burst indicator value relative to a horizontal synchronization signal.

24. The method as claimed in claim 22, wherein determining the location of a color burst signal within the video signal comprises:
   comparing the sum of the modulus values for the saturation and hue signals against a threshold value; and
   returning a comparison indicator value.

25. The method as claimed in claim 24, wherein returning a comparison indicator value comprises outputting the comparison indicator dependent on a backporch indicator signal.

26. The method as claimed in claim 25, wherein determining the location of a color burst signal comprises receiving a backporch indicator signal configured to indicate when the video signal is in the backporch region.

27. The method as claimed in claim 24, wherein the determining the location of a color burst signal comprises determining the threshold value.

28. The method as claimed in claim 27, wherein determining the threshold value comprises determining the threshold value as half the maximum value of the sum the modulus values for the saturation and hue signal.

29. The method as claimed in claim 24, wherein determining the location of a color burst signal further comprises:
   splitting the comparison indicator value signal into a determined number of parts; and
   examining at least one part of the comparison indicator value signal to generate a counter value output.

30. The method as claimed in claim 29, wherein examining at least one part of the comparison indicator value signal to generate a counter value output comprises:
   incrementing the counter value output when the comparison indicator value signal indicates that the occurrence of the sum of the modulus values for the saturation and hue signals is greater than the threshold for a greater portion of the part; and
   decrementing the counter value output when the comparison indicator value signal indicates that the occurrence of the sum of the modulus values for the saturation and hue signals is less than the threshold for a greater portion of the part.

31. The method as claimed in claim 30, wherein a degree of change of the incrementing the counter value output or decrementing the counter value output for at least one part is dependent on the ratio of the occurrence of the sum of the modulus values for the saturation and hue signals is greater than or less than the threshold.

32. A processor-readable medium encoded with instructions that, when executed by a processor, perform a method for decoding video claimed in claim 18.

33. An apparatus comprising at least one processor and at least one memory including computer code for one or more programs, the at least one memory and the computer code configured, to with the at least one processor, cause the apparatus to at least perform a method as claimed in claim 18.

34. A video decoder comprising:
   means for demodulating from a component video signal chroma signal: a hue signal and a saturation signal; and
   means for determining at least one video signal characteristic of the component video signal dependent on the hue and saturation signal,
   wherein the means for determining at least one video signal characteristic of the component video signal dependent on the hue and saturation signal comprises means for determining an encoding standard of the video signal,
   wherein the means for determining at least one video signal characteristic of the component video signal dependent on the hue and saturation signal comprises:
   means for determining when a phase alternating line phase lock occurs between the hue signal and saturation signal;
   means for receiving the video signal chroma signal and determining when a $D_b$ and $D_r$ sequence from the chroma signal match; and
   means for outputting an encoding standard indicator dependent on the condition of the signal lock and sequence match, and
   wherein the means for outputting an encoding standard indicator dependent on the condition of the signal lock and sequence match comprise means for outputting an unknown encoding standard indicator when the hue signal and the saturation signal are not phase locked and the $D_b$ and $D_r$ sequence from the chroma signal are not matched.

35. The video decoder as claimed in claim 34, wherein the means for outputting an encoding standard indicator dependent on the condition of the signal lock and sequence match comprises means for outputting a phase alternating line encoding standard indicator when the hue signal and the saturation signal are phase locked.

36. The video decoder as claimed in claim 34, wherein the means for outputting an encoding standard indicator dependent on the condition of the signal lock and sequence match comprise means for outputting a SECAM encoding standard indicator when the hue signal and the saturation signal are not phase locked and the $D_b$ and $D_r$ sequence from the chroma signal match.

37. The video decoder as claimed in claim 34, wherein the means for determining at least one video signal characteristic of the component video signal dependent on the hue and saturation signal comprise means for determining a location of a color burst signal within the video signal.

38. The video decoder as claimed in claim 37, wherein the means for determining the location of a color burst signal within the video signal comprise:
- means for summing the modulus values for the saturation and hue signals; and
- means for determining the color burst location dependent on the summed modulus values for the saturation and hue signals.

39. The video decoder as claimed in claim 38, wherein the means for determining the location of a color burst signal within the video signal further comprise means for outputting a color burst indicator value relative to a horizontal synchronization signal.

40. The video decoder as claimed in claim 38, wherein the means for determining the location of a color burst signal within the video signal comprise:
- means for comparing the sum of the modulus values for the saturation and hue signals against a threshold value; and
- means for returning a comparison indicator value.

41. The video decoder as claimed in claim 40, wherein the means for returning a comparison indicator value comprise means for outputting the comparison indicator dependent on a backporch indicator signal.

42. The video decoder as claimed in claim 41, wherein the means for determining the location of a color burst signal comprise means for receiving a backporch indicator signal configured to indicate when the video signal is in the backporch region.

43. The video decoder as claimed in claim 40, wherein the means for determining the location of a color burst signal comprise means for determining the threshold value.

44. The video decoder as claimed in claim 43, wherein the means for determining the threshold value comprise means for determining the threshold value as half the maximum value of the sum the modulus values for the saturation and hue signal.

45. The video decoder as claimed in claim 40, wherein the means for determining the location of a color burst signal further comprise:
- means for splitting the comparison indicator value signal into a determined number of parts; and
- means for examining at least one part comparison indicator value signal to generate a counter value output.

46. The video decoder as claimed in claim 45, wherein the means for examining each comparison indicator value signal to generate a counter value output comprise:
- means for incrementing the counter value output when the comparison indicator value signal indicates that the occurrence of the sum of the modulus values for the saturation and hue signals is greater than the threshold for a greater portion of the part; and
- means for decrementing the counter value output when the comparison indicator value signal indicates that the occurrence of the sum of the modulus values for the saturation and hue signals is less than the threshold for a greater portion of the part.

47. The video decoder as claimed in claim 46, wherein a degree of change of the counter value by the means for incrementing the counter value output and the means for decrementing the counter value output for at least one part is dependent on the ratio of the occurrence of the sum of the modulus values for the saturation and hue signals is greater than or less than the threshold.

* * * * *